United States Patent
Zhang et al.

(10) Patent No.: US 6,704,883 B1
(45) Date of Patent: *Mar. 9, 2004

(54) EVENT-ENABLED DISTRIBUTED TESTING SYSTEM

(75) Inventors: Chen Zhang, San Jose, CA (US); Donald T. Wooton, Hollister, CA (US)

(73) Assignee: Cisco Systems, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/470,025

(22) Filed: Dec. 22, 1999

(51) Int. Cl.$^7$ ................................................ G06F 11/00
(52) U.S. Cl. ............................ 714/4; 714/43; 709/224
(58) Field of Search ........................ 714/43, 4; 709/224

(56) References Cited

U.S. PATENT DOCUMENTS

| | | | |
|---|---|---|---|
| 5,187,787 A | 2/1993 | Skeen et al. | 395/600 |
| 5,257,369 A | 10/1993 | Skeen et al. | 395/650 |
| 5,339,392 A | 8/1994 | Risberg et al. | 395/161 |
| 5,838,919 A * | 11/1998 | Schwaller et al. | 709/224 |
| 5,881,237 A * | 3/1999 | Schwaller et al. | 709/224 |
| 5,937,165 A * | 8/1999 | Schwaller et al. | 709/224 |
| 6,061,725 A * | 5/2000 | Schwaller et al. | 370/230 |
| 6,269,330 B1 * | 7/2001 | Cidon et al. | 370/248 |
| 6,327,677 B1 * | 12/2001 | Garg et al. | 709/224 |
| 6,397,359 B1 * | 5/2002 | Chandra et al. | 709/224 |
| 6,408,335 B1 * | 6/2002 | Schwaller et al. | 703/13 |

* cited by examiner

*Primary Examiner*—Robert Beausoliel
*Assistant Examiner*—Christopher S. McCarthy
(74) *Attorney, Agent, or Firm*—Campbell Stephenson Ascolese LLP

(57) ABSTRACT

A distributed computer network testing system includes a test controller and at least one test agent. One or more test agents are configured with interpreters configured to execute instructions contained in a test script. When the test begins, the test controller publishes the test script to an event engine that broadcasts the script on the network. Test agents subscribing to the test script receive the script. Script receipt is the event that triggers test script execution by each interpreter on each subscribing test agent. Each test agent sends test results to the test controller that, in turn, sends all results to a test analysis agent. The analysis agent analyzes the test results and produces a test report that is output to the user.

19 Claims, 4 Drawing Sheets

EVENT-ENABLED DISTRIBUTED TESTING SYSTEM

BACKGROUND

1. Field of Invention

The present invention relates to computer networks, and in particular to distributed testing on computer networks that is performed by test agents under the control of a test controller.

2. Related Art

In a conventional eventing system model (e.g., publish/subscribe), actions by an entity (e.g., software) are based on the presence of "events." An event is any occurrence that the entity can sense. For example, an event may be mouse pointer movement into a designated portion of a video display, or may be a failure warning message sent by a hardware component. In some models a particular event has two parts: the event type, defining the category into which the event is placed, and the event data that contains specific information regarding this particular event.

A publisher is an entity that publishes (e.g., generates, transmits) an event to event engine. For example, a hard disk drive may publish a message that it is failing. The event engine is an entity that broadcasts (e.g., transmits using a one-to-many relationship) one or more events to event subscribers. An event subscriber is an entity that has requested (subscribed) notification from the event engine when a particular event occurs. Thus when a particular type of event occurs, the publisher publishes the event to the event engine which, in turn, broadcasts the event to one or more subscribers which then receive the event. See U.S. Pat. Nos. 5,187,789, 5,257,369, and 5,339,392, incorporated herein by reference, for examples of publisher/subscriber methodology.

Event publishing allows information to be distributed without direct addressing. Subscribers wait to receive selected events to which they subscribe, and will take predetermined action upon sensing the subscribed event has occurred. One predetermined event may be to publish a second event upon sensing the first event. In this way, one component may act as both a publisher and a subscriber.

A typical computer network is two or more interconnected computers capable of communicating with each other. Many computer network tests require that testing operations be conducted among two or more computers connected to the network. During some typical network distributed testing operations, one principle entity (e.g., software component stored on one computer) acts as a test controller and one or more other computers act as agents of the test controllers. Thus a test agent is an entity (e.g., software component stored on another computer) that acts at the direction of a test controller. Test agents are typically coded instructions stored in one or more test agent computers for performing the test.

Typical commercial test products are designed so that the coded test agent instructions are shipped to each test agent computer location, and then are installed at each location. The installation and configuration procedures are cumbersome when many test agents are involved in a single test. During testing, the test controller is required to maintain one-to-one (e.g., point-to-point) connection with each agent. Thus test configuration and maintenance is complex when many test agents are involved in a test. The test process is further complicated when the network includes different computers (e.g., routers, switches, end systems) configured to operate in two or more architectures, such as in UNIX® or WindowsNT®. Furthermore, the test controller must constantly monitor each agent's capabilities, and for when individual agents are added or deleted from the test. Test agent changes typically require the test be reconfigured.

Along with simplicity, a desirable distributed network test feature is the simultaneous, or near-simultaneous, execution by many test agents of a particular test. Simultaneous and near-simultaneous test execution by many agents allows, for example, testing of a sequencing algorithm at a particular network location when the agents are directed to send data to that one particular location. Such simultaneous or near-simultaneous execution is difficult under existing systems operating using many architectures.

What is required is an efficient and flexible distributed testing system that allows test agents operating in many architectures to simultaneously, or near-simultaneously, execute the desired test.

SUMMARY

In accordance with the present invention, a distributed testing environment includes a test controller, an event engine, and one or more test agents interconnected by a computer network. Before a test begins, each test agent is configured with a test script interpreter designed to operate under the software architecture of the test agent's computer. The interpreters operate in a conventional manner, reading and executing one coded instruction before reading and executing the next coded instruction. In embodiments of the present invention, the interpreters read and execute instructions contained in a test script.

The present invention's testing environment is event-driven. In accordance with the present invention, the event to which the test agents subscribe is publication of a test script by the test controller. The event type identifies the type of test to be executed and the event data is the actual test script to be run. Thus each test agent initiates test execution upon the receipt of the test script broadcast by the event engine. The test agents use the interpreters to carry out the test script instructions.

During test set-up, test agents negotiate with the test controller and are registered with the event engine. The negotiations allow the test controller to determine the test agent's configuration and capabilities. Registration informs the event engine that the test agent is available for the test. A test agent may be registered, but may not subscribe to all test scripts.

Once test agents are registered, the test controller receives a test script from a user or other source. The test controller parses the test script, and based on test script contents publishes the script to the event engine which broadcasts the script to the test agents. Test agents subscribing to the particular type of test script receive the broadcast script. The receipt of the test script is the event that triggers the interpreter to execute the instructions in the test script.

After running the test script, each test agent transfers the test results to the test controller. In turn, the test controller transfers all test results to an analysis agent. The analysis agent performs conventional test result analysis and produces a test report that is output to the user.

DETAILED DESCRIPTION

Identical element numbers in the accompanying drawings represent the same element.

Figure 1:
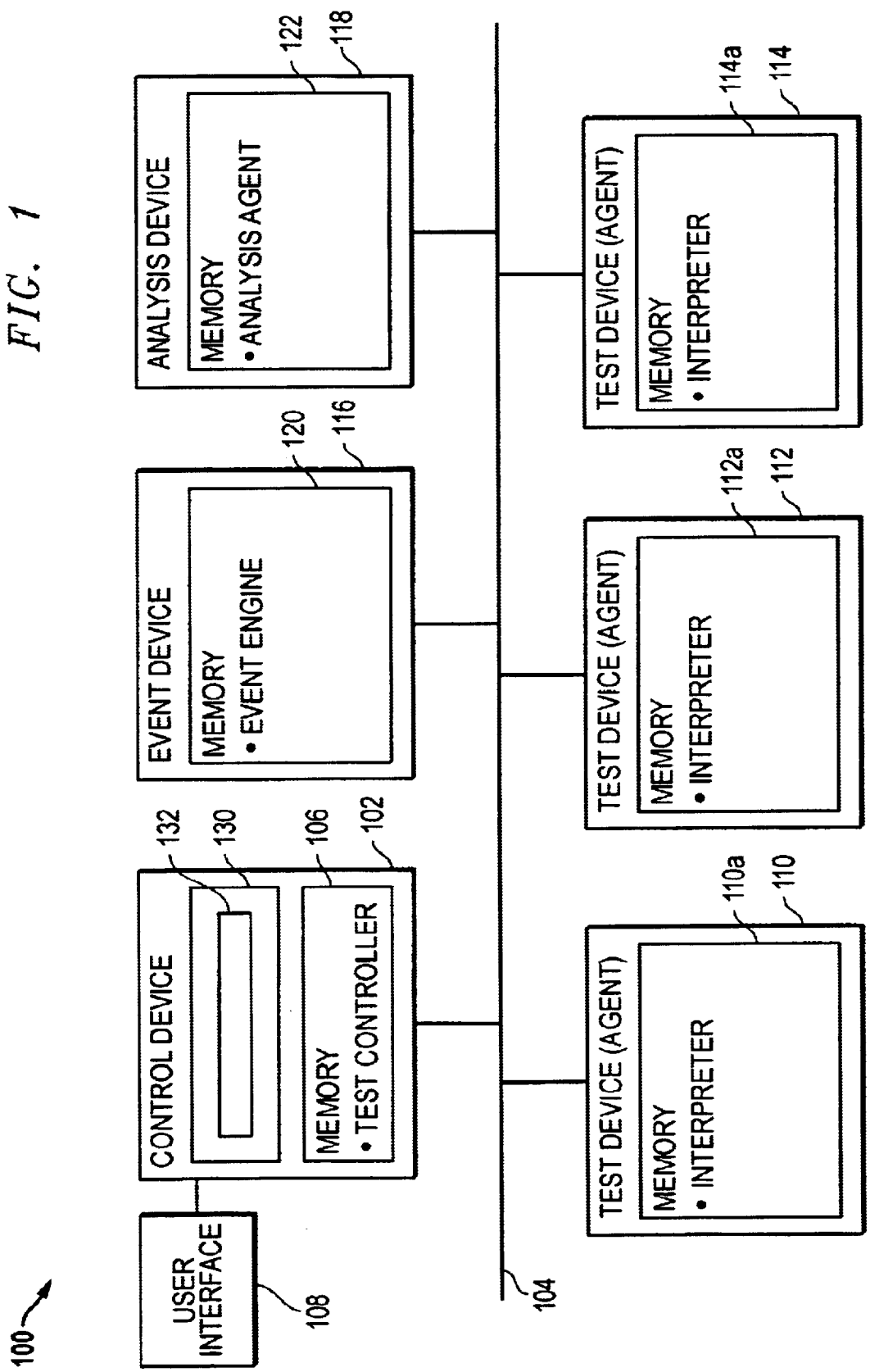
FIG. 1 is a block diagram showing a hardware embodiment of the present invention.

FIG. 1 is a block diagram illustrating an embodiment of testing environment 100. As shown, control device 102 is connected to conventional network 104. Control device 102 is an end system computer (e.g., network server) and includes memory 106. Memory 106 contains coded instructions (software), described below, to be executed as computer programs in accordance with the invention.

Conventional user interface 108 is connected to control device 102. Interface 108 includes one or more conventional human-machine interface devices (e.g., video display terminal, keyboard, printer, etc.) to allow the human test operator and control device 102 to communicate.

Three test devices 110, 112, and 114 are shown connected to network 104. These three test devices are illustrative; embodiments of the invention may have any number (e.g., thousands) of test devices. As shown, each test device is a computer and may be an end system (e.g., server, client) or intermediate system (e.g., router). Test devices are not restricted to operating under the same operating system. For example, device 110 may be operating under the WindowsNT® operating system, device 112 under the UNIX® operating system, and 114 under the CiscoIOS® operating system.

Each device 110, 112, and 114 includes a memory 110a, 112a, and 114a respectively. Each memory 110a, 112a, and 114a contains coded instructions to act as an interpreter configured to run in that device's native operating system. The interpreter is described below. Tests as directed by control device 102 are performed by software running on test devices 110, 112, and 114 which embody test agents.

FIG. 1 also shows event device 116 and analysis device 118 coupled to network 104. Devices 116 and 118 include conventional memories 120 and 122, respectively. Stored in memory 120 is an event engine (e.g., software) that receives one or more events from the test controller in device 102 for broadcast to the test devices. Stored in memory 122 is an analysis agent (e.g., software) that acts to perform analysis of test results at the direction of the test controller. The event engine and the analysis agent are shown in devices distinct from control device 102, although this configuration is illustrative and many hardware configurations may be used.

Control device 102 includes conventional storage medium drive 130. Conventional storage medium 132 (e.g., one or more CD-ROMs, one or more magnetic disks) is shown positioned in drive 130. Software associated with this invention may be stored on medium 132.

Figure 2:
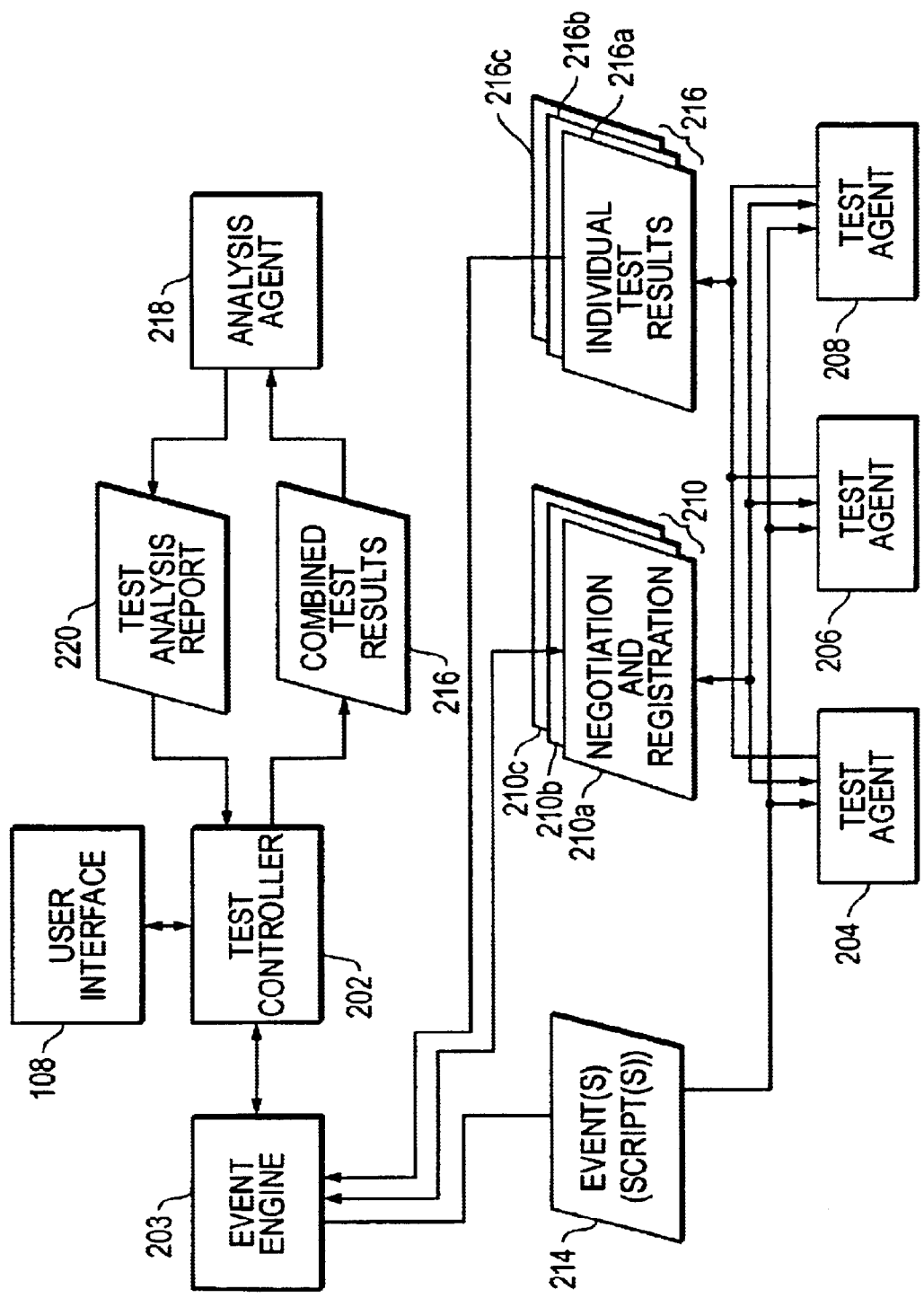
FIG. 2 is a block diagram showing components of, and data flow in, an embodiment of the present invention.

FIG. 1 depicts one possible hardware configuration embodying the present invention. To more clearly describe the invention, however, FIG. 2 illustrates a more general embodiment of the invention, and shows major components and data flow.

Test controller 202 controls the test environment for the test to be performed. User interface 108 and event engine 203 are connected to communicate with test controller 202. In response to user inputs on interface 108, one or more test agents are registered with event engine 203 for the test.

When the user directs an entity (e.g., a software component operating at a particular network address) be registered, controller 202 acts to control a negotiation and registration process with the entity through event engine 203 by exchanging information 210. The test agent publishes its registration information (e.g., capabilities, such as native operating system) to test controller 202. If the entity's capabilities allow it to act as an agent, the entity is registered by exchanging additional information 210. When the agent is registered, the agent receives from controller 202 an interpreter written to operate in the agent's native language (e.g., CiscoIOS®). Each test agent later uses the interpreter to run a test script. Once all required agents are registered, the test is performed. As shown, three test agents 204, 206, and 208 have been registered with controller 202 through the exchange of information 210a, 210b, and 210c, respectively.

In accordance with the invention, the test event is the publishing of a test script to be run by each subscribing test agent. In one embodiment, controller 202 publishes a test script for event engine 203 to broadcast (transmitted using a one-to-many relationship) to the test agents. In other embodiments controller 202 publishes more than one test script for the test agents. Broadcasting the script is much more efficient than sending the script to each test agent using individual connections between controller 202 and each test agent.

In accordance with the invention, receiving the test script is the event that each test agent uses to start the test. Thus near-simultaneous test execution may be accomplished by many agents. This testing method allows efficient testing of, for example, prioritization algorithms in devices receiving many near-simultaneous inputs. One possible test may be to evaluate a network server's prioritization algorithm when the server simultaneously receives one unique change of name request from many unique test agents. In other embodiments one script may be sent to one test agent, and a second script sent to another test agent. If, for example, test agent 204 is a server and test agents 206 and 208 are clients, then one script testing server 204 software may use inputs from client 206 and 208 software controlled by a second script.

In the FIG. 2 embodiment, test agents 204, 206, and 208 each execute test script 214 upon receipt. After agents 204, 206, and 208 complete their individual tests, each agent sends test results back to controller 202 for analysis. As shown, test agent 204 sends test results 216a, agent 206 sends results 216b, and agent 208 sends results 216c.

Controller 202 stores test results 216 and forwards results 216 to analysis agent 218 when all test agents have reported their results. The analysis agent is registered with the test controller using a procedure similar to test agent registration. The analysis agent publishes its capabilities, thereby informing the controller what test results the analysis agent can process. Analysis agent 218 performs a conventional analysis on the combined test results from each agent and sends test analysis report 220 to controller 202. Controller 202 then directs the analysis report to interface 108 for output to the user.

Figure 3:
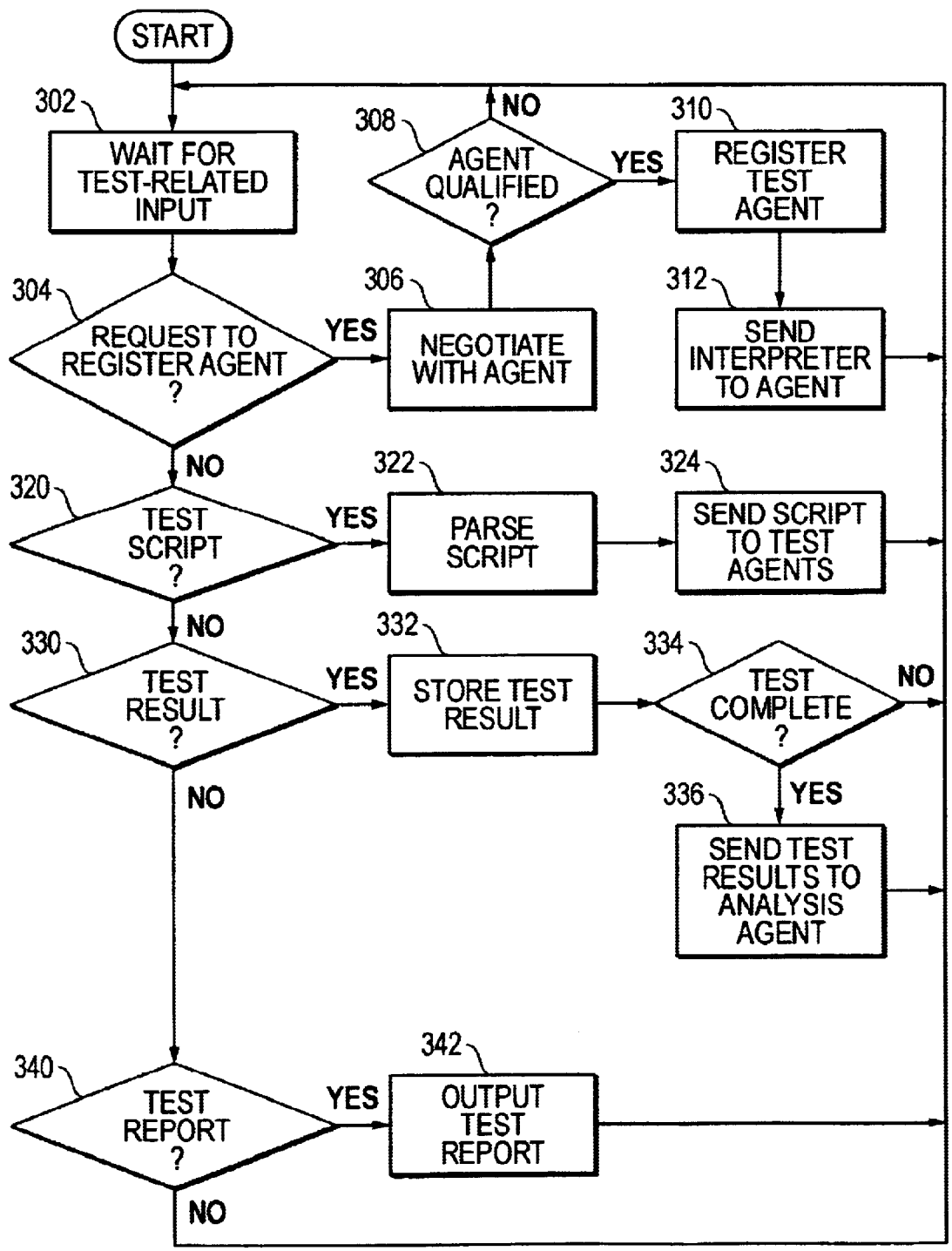
FIG. 3 is a flow diagram illustrating acts performed by a test controller.

FIG. 3 is a flow diagram illustrating one embodiment of a method performed in accordance with the present invention. The acts shown and described in relation to FIG. 3 are carried out by a test controller, such as controller 202 (FIG. 2), publishing to an event engine that broadcasts the test script. Nevertheless, persons familiar with network software will understand that the acts shown and described may be performed using a single computer, or may be distributed among two or more computers.

Block 302 represents that the test controller waits in a conventional wait state for one of four test-related inputs. The test controller receives requests to register test agents, test scripts to be sent to registered test agents, test results from test agents, and test reports from the analysis agent. Inputs may be received, for example, from user interface 108, one or more test agents 206–208, and analysis agent 218 (FIG. 2).

Block 304 represents that the test controller determines if the input is a request to register a particular agent as a test agent. If so, the test controller begins to negotiate with the particular agent as represented by block 306. During negotiations, the test controller determines the requested agent's capabilities, such as the agent's operating system and application programs. The test controller determines if the particular agent can act as a test agent, as shown by block 308. If the particular agent does not qualify to act as a test agent, the test controller returns to block 302 and awaits another test input. If the particular agent qualifies as a test agent, block 310 represents that the test controller registers the particular agent as a test agent for the test to be performed.

When an agent is registered as a test agent, the test controller sends a test script interpreter to the newly registered test agent as shown by block 312. After registering the test agent and sending the test script interpreter, the test controller returns to block 302 and awaits another test input.

Persons familiar with computer programming will understand that the interpreter sent is configured to operate in the test agent's architecture. For example, a test script interpreter sent to a UNIX® test agent is configured to lexically analyze the instructions in a particular test script and execute the instructions in the UNIX® environment. A test script interpreter sent to a CiscoIOS® test agent is configured to lexically analyze and execute the same particular test script, but this time in the CiscoIOS® environment. Thus in this example, when the test begins, the test controller sends the same test script to both the test agent operating in UNIX® and the test agent operating in CiscoIOS®.

A second input that the test controller may receive is a test script. This test script may be a single script, or may contain more than one component scripts, each to be run on different test agents as described above. The test script sent to the test controller contains a test type (event type) indicator and one or more component test scripts (event data) associated with that test type. In 320 the controller determines from the user input that the input is a test script. In 322 the controller parses the received test script and associates the test type with the one or more component scripts. In 324 the controller publishes each script(s) and its associated test type for broadcast by the event engine as described above. Thus the test controller publishes all test scripts required to perform the test and the test agents subscribe to the particular scripts they must run to complete the test.

The event engine triggers the test agents to run the test script by broadcasting the script itself. Broadcasting allows the test controller to distribute the test script to test agents more quickly than if the test scripts are individually addressed. In some embodiments, however, the script may be individually addressed or multi-cast to designated test agents, depending on the event type to which the test agent subscribes. As described below, the receipt by a test agent of the test script is the event that triggers the test agent to run the test. After the test controller sends the test script to the test agents, the controller returns to block 302 and awaits another test-related input.

A third test-related input the test controller receives is the test result from each test agent. After each agent runs the test script, each test agent sends the test result back to the test controller. Block 330 represents that the test controller subscribes to test result event types and recognizes the input as a test result. In 332 the controller stores the test result in memory. The test controller determines if all test agents have returned test results as shown in block 334. If some test results are missing, the test controller returns to block 302 and waits for additional inputs. Once the test controller has received test results from all test agents, the test controller sends all test results to the analysis agent, as represented by block 336.

The final test-related input the test controller receives is the test report from the analysis agent. Block 340 represents that the test controller determines if the input is a test report. If the input is a test report, the test controller outputs the test report to the user, shown by block 342.

Of importance is that the test execution on each test agent is event enabled. That is, each unique test agent begins to run the test script when each unique test agent recognizes that a common event has occurred. And, in accordance with embodiments of the invention, the event that triggers each test agent to execute the test script is each unique agent's receipt of the test script itself. The arrival of the test script is the event that triggers each agent to interpret and run the test script.

Figure 4:
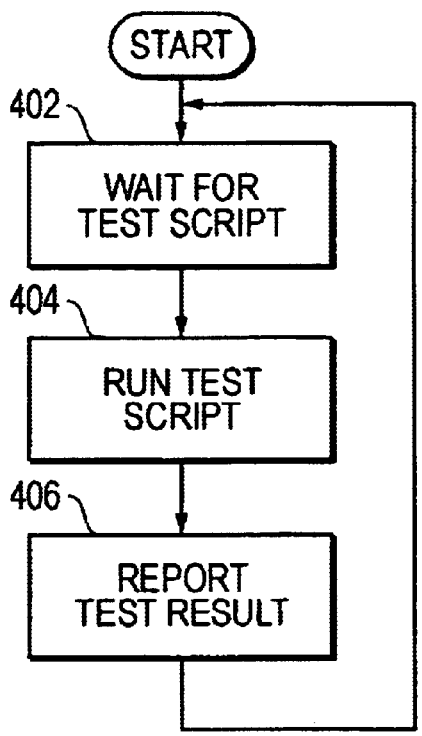
FIG. 4 is a flow diagram illustrating acts performed by a test agent.

FIG. 4 is a flow diagram illustrating actions in accordance with the invention taken by each test agent. Block 402 represents that the test agent waits in a conventional wait state for the test script(s) to which it subscribes to arrive. When the test script arrives, the arrival is the event that triggers the test agent interpreter to run the test script, shown in block 404. The test script may direct the test agent to run one test or multiple tests. Or, the agent may run multiple test scripts. Block 406 shows that when the test agent completes running the test script, the test agent reports the test result to the test controller, as described above.

Figure 5:
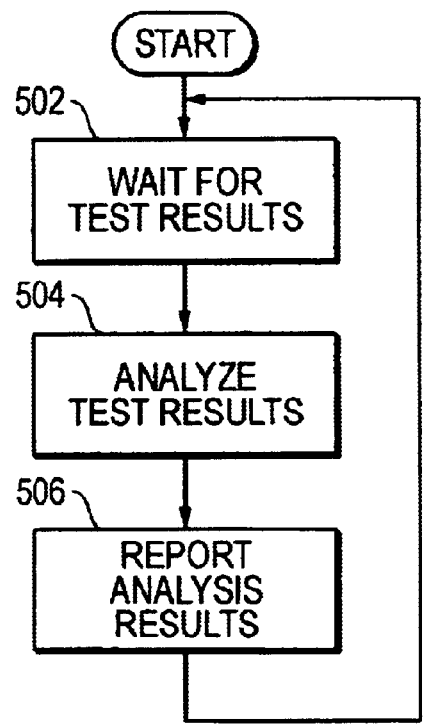
FIG. 5 is a flow diagram illustrating acts performed by an analysis agent.

FIG. 5 is a flow diagram illustrating actions in accordance with the invention taken by the analysis agent. Block 506 represents that the analysis agent waits in a conventional wait state to receive all test results from the test controller. Block 504 represents that the analysis agent performs one or more conventional analyses of the test results. Then, the analysis agent sends the analysis as a test report back to the test controller, as shown by block 506.

Persons familiar with the field of network testing will appreciate that many variations of the present invention exist. Although the invention has been described above in terms of specific embodiments, the scope of the invention is limited only by the following claims.

We claim:

1. A method of executing a distributed test over a computer network, the method comprising the acts of:
   configuring a first test agent connected to the network to run a test script in response to a request to configure the first test agent, wherein the act of configuring the first test agent to run a test script comprises:
      transferring a first interpreter to the first test agent, wherein the first interpreter is configured to interpret instructions contained in the test script under a software architecture of the first test agent;
   transferring the test script from a test controller connected to the network to the first test agent; and
   running the test script on the first test agent upon the occurrence of an event, wherein the event is the receipt by the first test agent of the test script.

2. The method according to claim 1 further comprising the acts of:

configuring a second test agent connected to the network to run the test script in response to a request to configure the first test agent;

transferring the test script from the test controller to the second test agent; and running the test script on the second test agent upon the occurrence of a second event, wherein the second event is the receipt by the second test agent of the test script.

3. The method of claim 2 wherein the act of configuring the second test agent to run the test script comprises:

transferring a second interpreter to the second test agent, wherein the second interpreter is configured to interpret instructions contained in the test script under a software architecture of the second test agent different from the software architecture of the test agent.

4. The method of claim 2 further comprising the acts of:

producing by the first test agent a test result after the running of the test script on the first test agent; and transferring the test result from the first test agent to the test controller.

5. The method of claim 2 further comprising the acts of:

receiving by the test controller a plurality of test results from a plurality of test agents;

transferring the test results to an analysis agent; and using the analysis agent to produce a test report containing an analysis of the test results.

6. The method according to claim 1, wherein the act of configuring the first test agent connected to the network to run the test script comprises:

configuring the first test agent to run the test script comprising a test type and one or more component test scripts.

7. A computer network testing system comprising:

a first test agent configured to run a test script upon the occurrence of an event, wherein the event is the receipt by the first test agent of the test script; and a test controller connected via a network to the first test agent, wherein the test controller is configured to transfer the test script to the first test agent and to transfer a first interpreter to the first test agent in response to a request to configure the first test agent, wherein the first interpreter is configured to interpret instructions contained in the test script under a software architecture of the first test agent.

8. The system of claim 7, wherein the first test agent is configured to run the test script using the first interpreter.

9. The system of claim 7 further comprising a second test agent connected via the network to the test controller, wherein the second test agent is configured to run the test script upon the occurrence of a second event, and the second event is the receipt by the second test agent of the test script.

10. The system of claim 9, wherein the second test agent is configured to run the test script using a second interpreter configured to interpret instructions contained in the test script under a software architecture of the second test agent.

11. The system of claim 7, wherein the first test agent is configured to produce a test result after running the test script, and to transfer the test result to the test controller.

12. The system of claim 7, further comprising an analysis agent, wherein the test controller is configured to transfer to the analysis agent a plurality of test results received from a plurality of test agents, and wherein the analysis agent is configured to produce a test report containing an analysis of the test results.

13. The system of claim 7, wherein the test script comprises a test type and one or more component test scripts.

14. A computer-readable storage medium configured with computer-executable coded instructions for at least one computer coupled to a network, the instructions comprising instructions operable to:

configure a first test agent connected to the network to run a test script in response to a request to configure the first test agent, wherein the instructions to configure the first test agent comprise instructions operable to transfer a first interpreter to the first test agent, wherein the first interpreter is configured to interpret instructions contained in the test script under a software architecture of the first test agent.

15. The storage medium of claim 14 wherein the instructions further comprise instructions operable to:

configure a second test agent connected to the network to run the test script in response to a request to configure the second test agent;

transfer the test script from the test controller to the second test agent; and run the test script on the second test agent upon the occurrence of a second event, wherein the second event is the receipt by the second test agent of the test script.

16. The storage medium of claim 15 wherein the instructions to configure the second test agent to run the test script comprise instructions operable to transfer a second interpreter to the second test agent, wherein the second interpreter is configured to interpret instructions contained in the test script under a software architecture of the second test agent different from the software architecture of the test agent.

17. The storage medium of claim 14 wherein the instructions further comprise instructions operable to:

produce by the first test agent a test result after the running of the test script on the first test agent; and transfer the test result from the first test agent to the test controller.

18. The storage medium of claim 17 wherein the instructions further comprise instructions operable to:

receive by the test controller a plurality of test results from a plurality of test agents;

transfer the test results to an analysis agent; and use the analysis agent to produce a test report containing an analysis of the test results.

19. The storage medium of claim 14, wherein the instructions to configure the first test agent connected to the network to run the test script comprise:

instructions operable to configure the first test agent to run a test script comprising a test type and one or more component test scripts.

* * * * *

UNITED STATES PATENT AND TRADEMARK OFFICE
CERTIFICATE OF CORRECTION

PATENT NO. : 6,704,883 B1 Page 1 of 1
DATED : March 9, 2004
INVENTOR(S) : Chen Zhang and Donald T. Wooten It is certified that error appears in the above-identified patent and that said Letters Patent is hereby corrected as shown below:

Column 7,
Lines 20 and 25, delete "claim 2" and insert -- claim 1 --.

Signed and Sealed this

Eighteenth Day of October, 2005

JON W. DUDAS
*Director of the United States Patent and Trademark Office*